US012695637B2

(12) United States Patent
Azuchi et al.

(10) Patent No.: US 12,695,637 B2
(45) Date of Patent: Jul. 28, 2026

(54) INFORMATION PROCESSING SYSTEM, INFORMATION PROCESSING METHOD, SERVER, BLOCK CHAIN NODE, AND PROGRAM

(71) Applicant: CHAINTOPE INC., Fukuoka (JP)

(72) Inventors: Shigeyuki Azuchi, Iizuka (JP); Hideki Shoda, Iizuka (JP); Teruaki Murakami, Iizuka (JP); Takanori Tanaka, Iizuka (JP)

(73) Assignee: CHAINTOPE INC., Fukuoka (JP)

( * ) Notice: Subject to any disclaimer, the term of this patent is extended or adjusted under 35 U.S.C. 154(b) by 48 days.

(21) Appl. No.: 18/851,672

(22) PCT Filed: Mar. 24, 2023

(86) PCT No.: PCT/JP2023/012002
§ 371 (c)(1),
(2) Date: Jun. 5, 2025

(87) PCT Pub. No.: WO2023/190249
PCT Pub. Date: Oct. 5, 2023

(65) Prior Publication Data
US 2025/0392484 A1 Dec. 25, 2025

(30) Foreign Application Priority Data

Mar. 31, 2022 (JP) ................................. 2022-061015
Feb. 9, 2023 (JP) ................................. 2023-018759

(51) Int. Cl.
*H04L 9/00* (2022.01)
*G06F 16/23* (2019.01)
*H04L 9/32* (2006.01)

(52) U.S. Cl.
CPC ............ *H04L 9/50* (2022.05); *G06F 16/2379* (2019.01); *H04L 9/3247* (2013.01)

(58) Field of Classification Search
CPC ..... H04L 9/008; H04L 9/3218; H04L 9/3221; H04L 9/3247; H04L 9/50; G04F 16/2379
See application file for complete search history.

(56) References Cited

U.S. PATENT DOCUMENTS

2016/0253622 A1* 9/2016 Sriram ................. H04L 9/3247
713/179
2019/0018029 A1 1/2019 Muranaka et al.
(Continued)

FOREIGN PATENT DOCUMENTS

CA 3064428 A1 11/2018
CN 110503438 A 11/2019
(Continued)

OTHER PUBLICATIONS

Malik, Sidra et al. "PrivChain: Provenance and Privacy Preservation in Blockchain enabled Supply Chains." 2022 IEEE International Conference on Blockchain (Blockchain) (2021): 157-166. (Year: 2021).*

(Continued)

*Primary Examiner* — Jeremy S Duffield
(74) *Attorney, Agent, or Firm* — Mark T. Vogelbacker; Eckert Seamans Cherin & Mellott, LLC

(57) ABSTRACT

An information processing system includes a server, plural block chain nodes, and plural terminals. Each of the plural block chain nodes reads from a block chain each first transaction data that is past transaction data linked to a second transaction data broadcast by the server. Each of the plural block chain nodes verifies whether or not a generation target item of the second transaction data is configured by a raw material contained in a generation source item of the first transaction data based on a relationship between a commitment value of the generation target item contained in (Continued)

the second transaction data and a commitment value of the generation source item contained in the first transaction data.

7 Claims, 4 Drawing Sheets

(56)                References Cited

U.S. PATENT DOCUMENTS

| | | | |
|---|---|---|---|
| 2019/0114584 A1 | 4/2019 | Toohey et al. | |
| 2019/0180291 A1 | 6/2019 | Schmeling et al. | |
| 2020/0043001 A1 | 2/2020 | Ng | |
| 2020/0118117 A1 | 4/2020 | McManus et al. | |
| 2020/0186348 A1* | 6/2020 | Lampkins | H04L 9/321 |
| 2024/0095725 A1* | 3/2024 | Dittmann | H04L 9/50 |

FOREIGN PATENT DOCUMENTS

| | | |
|---|---|---|
| CN | 110807641 A | 2/2020 |
| CN | 111033244 A | 4/2020 |
| CN | 112330345 A | 2/2021 |
| JP | S557524 B1 | 2/1980 |
| JP | 2020-035436 A | 3/2020 |
| JP | 2020-071617 A | 5/2020 |
| JP | 2020-524924 A | 8/2020 |
| JP | 2021-064219 A | 4/2021 |
| WO | 2018/064645 A1 | 4/2018 |
| WO | 2018/217788 A1 | 11/2018 |
| WO | 2021/242183 A1 | 12/2021 |
| WO | 2022/071365 A1 | 4/2022 |

OTHER PUBLICATIONS

Extended European Search Report for EP4502991, dated Feb. 16, 2026.
Pedersen, T. P., et al., Non-Interactive and Information—Theoretic Secure Verifiable Secret Sharing, Advances in Crytology—Crypto '91, LNCS 576, pp. 129-140, 1992, https://link.springer.com/content/pdf/10.1007%2F3-540-46766-1_9.pdf#page=3!.
https://www.semanticscholar.org/paper/Borromean-Ring-Signatures-%E2%88%97-Maxwell-Poelstra/4160470c7f6cf05ffc81a98e8fd67fb0c84836ea.
Bulletproofs ( https://eprint.iacr.org/2017/1066.pdf ).
https://www.iacr.org/archive/asiacrypt2010/6477178/6477178.pdf.
International Search Report of PCT/JP2023/012002, dated May 16, 2023.
Written Opinion of PCT/JP2023/012002, dated May 16, 2023.
English language translation of "Written Opinion of the International Searching Authority" for corresponding International Patent Application No. PCT/JP2023/012002, dated May 16, 2023, 5 pp.

* cited by examiner

INFORMATION PROCESSING SYSTEM, INFORMATION PROCESSING METHOD, SERVER, BLOCK CHAIN NODE, AND PROGRAM

CROSS-REFERENCE TO RELATED APPLICATION

This application is a National Phase of International Application Number PCT/JP2023/012002, filed Mar. 24, 2023, which claims priority to and the benefit of Japanese Patent Application Numbers 2023-018759, filed Feb. 9, 2023, and 2022-061015, filed Mar. 31, 2022, the disclosures of each which are incorporated herein by reference in their entireties.

TECHNICAL FIELD

The present disclosure relates to an information processing system, an information processing method, a server, a block chain node, and a program.

BACKGROUND ART

Technology is hitherto known that records tracking information of a moving target item in a block chain while reducing a volume of data of the item tracking information (see, for example, Japanese Patent Application Laid-Open (JP-A) No. 2021-64219). In the technology disclosed in JP-A No. 2021-64219, in cases in which a server has received a request signal including identification information of an item subject to tracking, the server acquires, from a block chain, a series of data of transactions performed of movement of the item corresponding to the identification information contained in the request signal and a series of an accumulator corresponding to the transaction data series. The server then verifies whether or not the identification information of the item subject to tracking is stored in each accumulator in the acquired accumulator series, and outputs a verification result.

SUMMARY OF INVENTION

Technical Problem

However, sometimes a user using an item, which is either a product or a service, wants to know which components this item is configured by. For example, consider a case in which a given manufactured product is manufactured. Often a manufactured product is configured including various raw materials (for example, rare metals or the like).

In particular, in recent years sustainable development goals (SDGs) have been determined by the United Nations, and there is a demand to provide items that have a low impact on the global environment. This means that were it to be possible to verify that components configuring an item have a low impact on the global environment, then such a verification result could be considered for use as a SDG target. However, from external appearance or the like it is difficult to discern differences related to processed items and manufactured products that have employed the same type of raw material. However, were information related to the raw materials of an item (or information related to the process of energy supply) to be in a trackable state, then this would enable setting, measurement, and evaluation of an index based on this information, and enable limitations to be place on the movement of items whose index has not satisfied a specific standard.

Note that often a supply chain for raw materials and intermediate materials is formed by many businesses up to when a manufactured product is supplied to a consumer. For example, a given business A purchases plural raw materials a1, a2, a3, and manufactures an intermediate material $M_A$ from the raw materials a1, a2, a3. Next, a business B purchases the intermediate material $M_A$ from the business A, adds raw materials b1, b2 to the intermediate material $M_A$, and manufactures an intermediate material $M_B$. Next, a business C purchases the intermediate material $M_B$ from the business B, combines the intermediate material $M_B$ with a number of other different intermediate materials, and manufactures a manufactured product $M_C$. The manufactured product $M_C$ is then supplied from the business C to a consumer.

In such cases, for example, sometimes a consumer, or an organization or the like that performs quality inspections, wants to know information related to the country of origin of the raw materials contained in the manufactured product $M_C$, the percent of recycled material contained, the purity measured in a refining process, and compounding ratios of components such as elements, molecules, or the like. Furthermore, sometimes a consumer, an organization that controls distribution, or the like wants to know information related to what sort of businesses were involved in the manufacture and supply of the manufactured product $M_C$. Moreover, sometimes each business also wants to know information related to the raw materials and components they themselves have purchased.

Suppose that network technology such as block chain or the like was to be employed for public disclosure of data related to items subject to such transactions, then plural businesses and consumers would be able to freely look at the information related to the transaction subjects. For example, by looking at information related to the country of origin of the raw materials contained in a given component, the percent of recycled material contained, the purity measured in a refining process, and compounding ratios of components such as elements, molecules, or the like, plural businesses and consumers would be able to confirm what sort of raw materials were employed to configure the components or intermediate materials or the like that they themselves have acquired, would be able to use this for display on a product that they themselves are shipping, and would be able to utilize this to discern components or intermediate materials or the like that are not compliant with standards set as their own target.

However, were such data to be recorded in a block chain and this data to be publicly disclosed then this would enable an unlimited number of third parties to also freely look at such data. For example, were data related to knowhow when manufacturing a manufactured product to be included in the data recorded in a block chain then there would be a possibility that this would damage the competitive strength of that business.

For example, there are sometimes situations in which a given specific business might conceivably wish to keep information related to a compounding ratio of raw materials secret from a competitor business, and even if disclosure of such information to a business having a direct transaction contractual relationship would conceivably be acceptable, there would be a wish not to disclose such information to third parties with no contractual relationship.

In consideration of the above circumstances, an object of the present disclosure is to verify that transactions of raw materials contained in an item are not improper while keeping the numerical quantities of the raw materials contained in an item secret.

Solution to Problem

In order to achieve the above object, an information processing system according to the present disclosure is an information processing system including a server, plural block chain nodes, and plural terminals. In the information processing system the terminal transmits, to the server, generation target item identification data expressing identification information of a generation target item, raw material identification data that is identification information of a raw material used when generating the generation target item, numerical quantity data expressing a numerical quantity of the raw material, and generation source item identification data expressing identification information of a generation source item. The server: computes a commitment value of the generation target item by performing a secret computation based on a parameter value and the numerical quantity data corresponding to the raw material; stores a combination of the raw material identification data and the generation target item identification data in a specific data structure; acquires first transaction data that is transaction data recorded in a block chain stored in a storage section of the block chain node and that is transaction data containing the generation source item identification data in output data; and broadcasts, to the plural block chain nodes, second transaction data that is transaction data containing an address expressing an originator of the generation target item, an address expressing a recipient of the generation target item, and the data structure, and that includes the generation source item identification data in input data and that includes the data structure including the generation target item identification data in output data. Each of the plural block chain nodes: reads from a block chain each first transaction data that is past transaction data linked to the second transaction data broadcast by the server; and verifies whether or not the generation target item of the second transaction data is configured by the raw material contained in the generation source item of the first transaction data based on a relationship between the commitment value of the generation target item contained in the second transaction data and the commitment value of the generation source item contained in the first transaction data; and records the second transaction data in the block chain in cases in which the generation target item of the second transaction data has been determined to be configured from the raw material of the first transaction data.

A server of the present disclosure is a server in an information processing system including the server, plural block chain nodes, and plural terminals. In the information processing system the terminal transmits, to the server, generation target item identification data expressing identification information of a generation target item, raw material identification data that is identification information of a raw material used when generating the generation target item, numerical quantity data expressing a numerical quantity of the raw material, and generation source item identification data expressing identification information of a generation source item. The server: computes a commitment value of the generation target item by performing a secret computation based on a parameter value and the numerical quantity data corresponding to the raw material; stores a combination of the raw material identification data and the generation target item identification data in a specific data structure; acquires first transaction data that is transaction data recorded in a block chain stored in a storage section of the block chain node and that is transaction data containing the generation source item identification data in output data; and broadcasts, to the plural block chain nodes, second transaction data that is transaction data containing an address expressing an originator of the generation target item, an address expressing a recipient of the generation target item, and the data structure, and that includes the generation source item identification data in input data and that includes the data structure including the generation target item identification data in output data. Each of the plural block chain nodes: reads from a block chain each first transaction data that is past transaction data linked to the second transaction data broadcast by the server; and verifies whether or not the generation target item of the second transaction data is configured by the raw material contained in the generation source item of the first transaction data based on a relationship between the commitment value of the generation target item contained in the second transaction data and a commitment value of the generation source item contained in the first transaction data; and records the second transaction data in the block chain in cases in which the generation target item of the second transaction data has been determined to be configured from the raw material of the first transaction data.

A block chain node of the present disclosure is a block chain node in an information processing system including a server, plural of the block chain nodes, and plural terminals. In the information processing system the terminal transmits, to the server, generation target item identification data expressing identification information of a generation target item, raw material identification data that is identification information of a raw material used when generating the generation target item, numerical quantity data expressing a numerical quantity of the raw material, and generation source item identification data expressing identification information of a generation source item. The server: computes a commitment value of the generation target item by performing a secret computation based on a parameter value and the numerical quantity data corresponding to the raw material; stores a combination of the raw material identification data and the generation target item identification data in a specific data structure; acquires first transaction data that is transaction data recorded in a block chain stored in a storage section of the block chain node and that is transaction data containing the generation source item identification data in output data; and broadcasts, to the plural block chain nodes, second transaction data that is transaction data containing an address expressing an originator of the generation target item, an address expressing a recipient of the generation target item, and the data structure, and that includes the generation source item identification data in input data and that includes the data structure including the generation target item identification data in output data. Each of the plural block chain nodes: reads from a block chain each first transaction data that is past transaction data linked to the second transaction data broadcast by the server; and verifies whether or not the generation target item of the second transaction data is configured by the raw material contained in the generation source item of the first transaction data based on a relationship between the commitment value of the generation target item contained in the second transaction data and a commitment value of the generation source item contained in the first transaction data; and records the second transaction data in the block chain in cases in which the generation target item of the second transaction data has been determined to be configured from the raw material of the first transaction data.

An information processing method of the present disclosure is an information processing method executed in an information processing system including a server, plural block chain nodes, and plural terminals. In the information processing method the terminal transmits, to the server, generation target item identification data expressing identification information of a generation target item, raw material identification data that is identification information of a raw material used when generating the generation target item, numerical quantity data expressing a numerical quantity of the raw material, and generation source item identification data expressing identification information of a generation source item. The server: computes a commitment value of the generation target item by performing a secret computation based on a parameter value and the numerical quantity data corresponding to the raw material; stores a combination of the raw material identification data and the generation target item identification data in a specific data structure; acquires first transaction data that is transaction data recorded in a block chain stored in a storage section of the block chain node and that is transaction data containing the generation source item identification data in output data; and broadcasts, to the plural block chain nodes, second transaction data that is transaction data containing an address expressing an originator of the generation target item, an address expressing a recipient of the generation target item, and the data structure, and that includes the generation source item identification data in input data and that includes the data structure including the generation target item identification data in output data. Each of the plural block chain nodes: reads from a block chain each first transaction data that is past transaction data linked to the second transaction data broadcast by the server; and verifies whether or not the generation target item of the second transaction data is configured by the raw material contained in the generation source item of the first transaction data based on a relationship between the commitment value of the generation target item contained in the second transaction data and a commitment value of the generation source item contained in the first transaction data; and records the second transaction data in the block chain in cases in which the generation target item of the second transaction data has been determined to be configured from the raw material of the first transaction data.

A program of the present disclosure is a program executed in a server of an information processing system including the server, plural block chain nodes, and plural terminals. The terminal transmits, to the server, generation target item identification data expressing identification information of a generation target item, raw material identification data that is identification information of a raw material used when generating the generation target item, numerical quantity data expressing a numerical quantity of the raw material, and generation source item identification data expressing identification information of a generation source item. The server: computes a commitment value of the generation target item by performing a secret computation based on a parameter value and the numerical quantity data corresponding to the raw material; stores a combination of the raw material identification data and the generation target item identification data in a specific data structure; acquires first transaction data that is transaction data recorded in a block chain stored in a storage section of the block chain node and that is transaction data containing the generation source item identification data in output data; and broadcasts, to the plural block chain nodes, second transaction data that is transaction data containing an address expressing an originator of the generation target item, an address expressing a recipient of the generation target item, and the data structure, and that includes the generation source item identification data in input data and that includes the data structure including the generation target item identification data in output data. Each of the plural block chain nodes: reads from a block chain each first transaction data that is past transaction data linked to the second transaction data broadcast by the server; and verifies whether or not the generation target item of the second transaction data is configured by the raw material contained in the generation source item of the first transaction data based on a relationship between the commitment value of the generation target item contained in the second transaction data and a commitment value of the generation source item contained in the first transaction data; and records the second transaction data in the block chain in cases in which the generation target item of the second transaction data has been determined to be configured from the raw material of the first transaction data.

A program of the present disclosure is a program executed in a block chain node of an information processing system including a server, plural of the block chain nodes, and plural terminals. The terminal transmits, to the server, generation target item identification data expressing identification information of a generation target item, raw material identification data that is identification information of a raw material used when generating the generation target item, numerical quantity data expressing a numerical quantity of the raw material, and generation source item identification data expressing identification information of a generation source item. The server: computes a commitment value of the generation target item by performing a secret computation based on a parameter value and the numerical quantity data corresponding to the raw material; stores a combination of the raw material identification data and the generation target item identification data in a specific data structure; acquires first transaction data that is transaction data recorded in a block chain stored in a storage section of the block chain node and that is transaction data containing the generation source item identification data in output data; and broadcasts, to the plural block chain nodes, second transaction data that is transaction data containing an address expressing an originator of the generation target item, an address expressing a recipient of the generation target item, and the data structure, and that includes the generation source item identification data in input data and that includes the data structure including the generation target item identification data in output data. Each of the plural block chain nodes: reads from a block chain each first transaction data that is past transaction data linked to the second transaction data broadcast by the server; and verifies whether or not the generation target item of the second transaction data is configured by the raw material contained in the generation source item of the first transaction data based on a relationship between the commitment value of the generation target item contained in the second transaction data and a commitment value of the generation source item contained in the first transaction data; and records the second transaction data in the block chain in cases in which the generation target item of the second transaction data has been determined to be configured from the raw material of the first transaction data.

The present disclosure obtains the advantageous effect of being able to verify that transactions of raw materials contained in an item are not improper while keeping the numerical quantities of the raw materials contained in an item secret.

DESCRIPTION OF EMBODIMENTS

Figure 1:
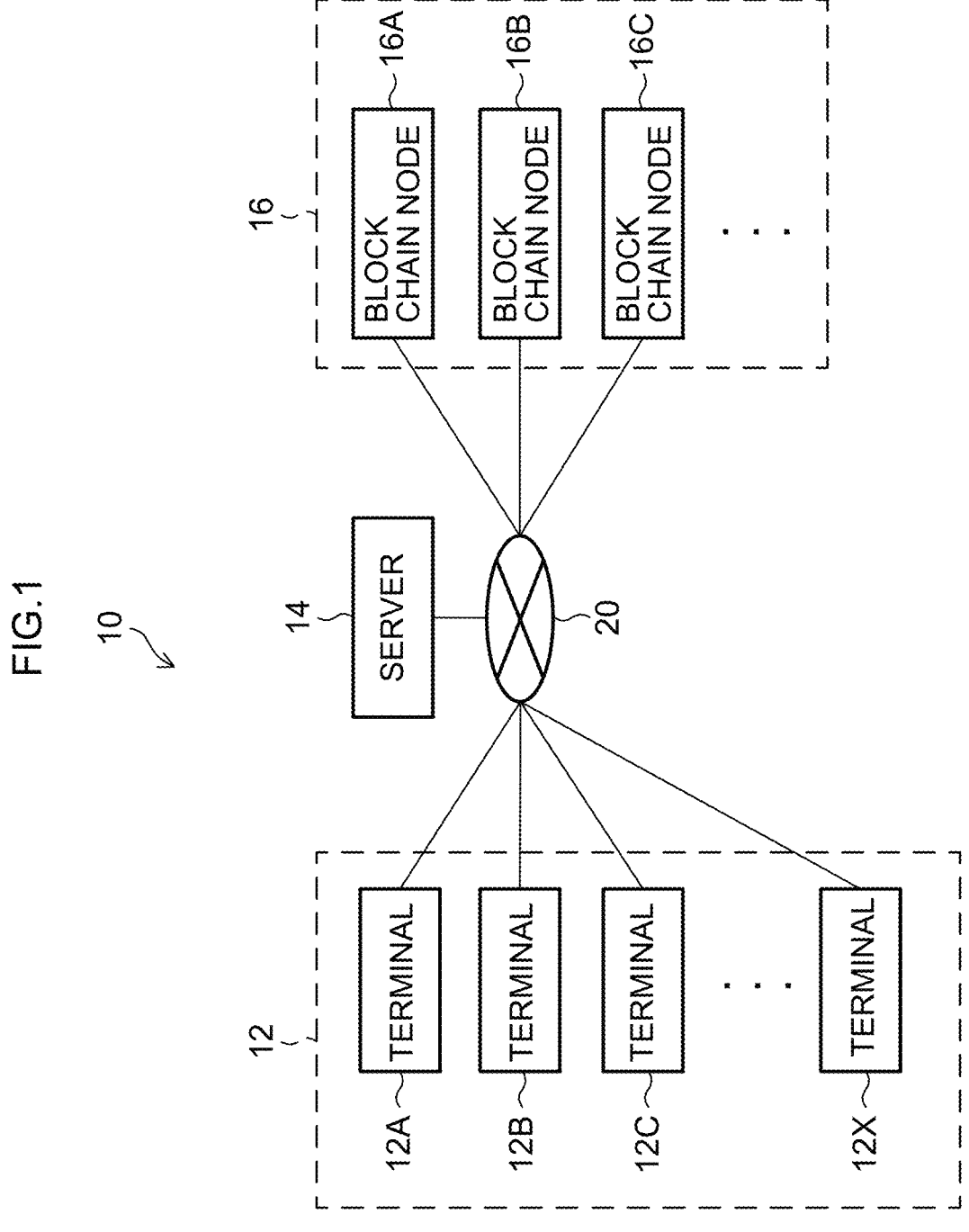
FIG. 1 is a diagram illustrating an example of a schematic configuration of an information processing system of the present exemplary embodiment.

Detailed explanation follows regarding exemplary embodiments, with reference to the drawings.
System Configuration of Information Processing System FIG. 1 is a block diagram illustrating an information processing system 10 of the present exemplary embodiment. As illustrated in FIG. 1, the information processing system 10 of the present exemplary embodiment is configured including terminals 12, a server 14, and block chain nodes 16. Each device of the information processing system 10 is connected to a network 20, such as the internet or the like, for example. Note that the block chain nodes will simply be indicated as "block chain nodes 16" except in cases in which a particular node is being described from out of plural block chain nodes 16A, 16B, 16C. Moreover, terminals will simply be indicated as "terminals 12" except in cases in which a particular terminal is described from out of plural terminals 12A, 12B, 12C, . . . , 12X.

Note that although three block chain nodes are illustrated in FIG. 1, there may be more block chain nodes included. Moreover, although four terminals are illustrated in FIG. 1, there may be more terminals included.

In recent years there has been an increase in cases in which public disclosure is demanded for some events that occurred in the process of manufacturing or distributing a product or service (hereinafter sometimes simply referred to as an "item"). For example, as evidence of engagement with environmental issues, there are cases in which public disclosure is demanded of numerical values for the percentage of renewable energy, amount of $CO_2$ discharged, or percentage of recycled raw material employed in an item when the item has been provided by each business.

Currently the public disclose of such information is often performed by announcement of the whole of all business activities periodically (for example, annually). On the other hand, were details to be appended to each individual item, then this information could be thought of as added value to the item. Moreover, appending details to an item would serve as proof that the item has complied with distribution restrictions of the international community.

However, consider a case in which an item X is passed from a given business U1 to a different business U2, the business U2 has manufactured a new item Y based on the item X, and this sequence of events is represented as data representing a single transaction docket. The data representing the transaction docket is recorded in a block chain. Due to the data representing the transaction docket being stored in storage sections (omitted in the drawings) of the plural block chain nodes 16A, 16B, 16C, the transaction data recorded in the block chains is publicly disclosed. Third parties are able to inspect this transaction data. As a result, details are appended to an item, and a series of information is appended to an item and publicly disclosed when the item is manufactured or supplied.

However, on the other hand, information that is desired to be concealed is also present in the information about the item being manufactured or supplied. For example, from the perspective of a business that mixed together plural raw materials to manufacture an intermediate material, information related to the mixing ratio of the raw materials is company knowhow, and would be expected to be something desired to be concealed. Information related so such knowhow is the intellectual property of each business, and so generally the public disclosure of intellectual property of each business to a third party without compensation is considered as something to be avoided.

The information processing system 10 of the present exemplary embodiment accordingly does not record information related to the numerical quantities of the raw materials contained in the item in a block chain, and verifies that transactions of the raw materials contained in the item are not improper while keeping the numerical quantities of the raw materials contained in the item secret.

Specifically, in the information processing system 10 of the present exemplary embodiment, a commitment value for each item is computed by executing a specific secret computation based on quantitative data expressing the numerical quantities of raw materials contained in the item and parameter values set for each of the raw materials. In the information processing system 10 of the present exemplary embodiment, the commitment values are recorded in a block chain, and verification that transactions of the raw materials contained in each of the items were not improper is made based on the commitment values. Information related to the numerical quantities of the raw materials contained in the item is accordingly not recorded in a block chain, enabling verification that transactions with the raw materials contained in the item were not improper, while keeping the numerical quantities of the raw materials contained in the item secret.

Each device included in the information processing system 10 may be implemented by a computer containing a central processing unit (CPU), read only memory (ROM) stored with a program or the like for implementing each processing routine, random access memory (RAM) for temporarily storing data, memory serving as a storage means, a network interface, and the like.

Figure 2:
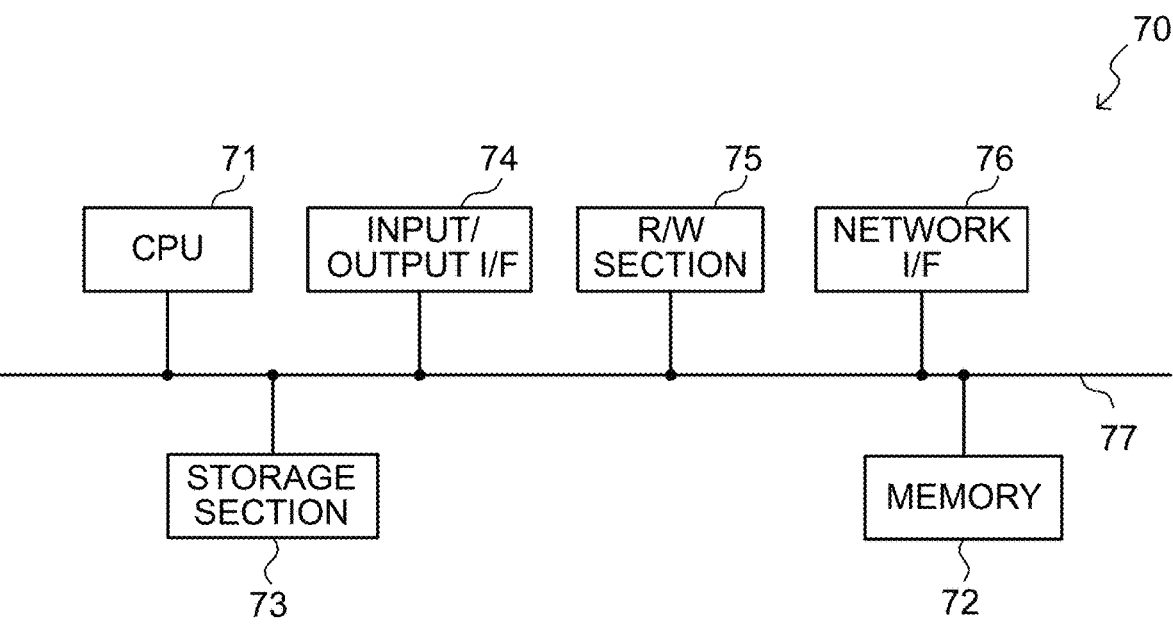
FIG. 2 is a schematic block diagram of a computer that functions as each device configuring an information processing system.

The terminals 12, the server 14, and the block chain nodes 16 may each, for example, be realized by a computer 70 such as that illustrated in FIG. 2. The computer 70 includes a CPU 71, memory 72 serving as a temporary storage region, and a non-volatile storage section 73. The computer 70 also includes an input/output interface (I/F) 74 to which an input/output device and so on (not illustrated in the drawings) are connected, and a read/write (R/W) section 75 that controls reading and writing of data with respect to a recording medium. The computer 70 also includes a network I/F 76 connected to a network such as the internet. The CPU 71, the memory 72, the storage section 73, input/output I/F 74, the R/W section 75, and the network I/F 76 are connected to each other through a bus 77.

The storage section 73 may by realized by a hard disk drive (HDD), a solid state drive (SSD), flash memory, or the like. A program for causing the computer 70 to function is stored in the storage section 73 serving as a storage medium. The CPU 71 reads the program from the storage section 73, expands the program in the memory 72, and sequentially executes processes included in the program.

Operation of Information Processing System 10

Next, description follows regarding operation of the information processing system 10 of the present exemplary embodiment. In the present exemplary embodiment, the information processing system 10 will be described for an example in which details about a product C are recorded in a block chain.

Note that the product C is configured including cobalt, nickel, and manganese as raw materials. Description follows regarding an example of in which cobalt, nickel, and manganese that are the raw materials of the product C are extracted from a product A and a product B, and the product C is generated utilizing the extracted raw materials. Note that description follows regarding an example of a case in which part (or all) of the raw materials configuring the product A, or part (or all) of the raw materials configuring the product B, is not consumed in the process of generating the product C, and a product D that corresponds to left over raw materials not consumed is generated. This means that the products A and B are examples of generation source items, and the product C is an example of a generation target item.

The present exemplary embodiment is able to track products that are items, and track a combination of raw materials thereof (for example, the product C is configured from cobalt: 5, nickel: 4, manganese: 9 as raw materials thereof). Note that there is a need to keep the quantitative data about the raw materials concealed when performing the tracking. On the other hand, there is a need to prove to a third party that, for example, the product C was generated from product A and product B.

Thus the present exemplary embodiment enables proof that the item was manufactured appropriately while concealing the quantitative data of the raw materials configuring the item. A specific description thereof is set out below.

Figure 3:
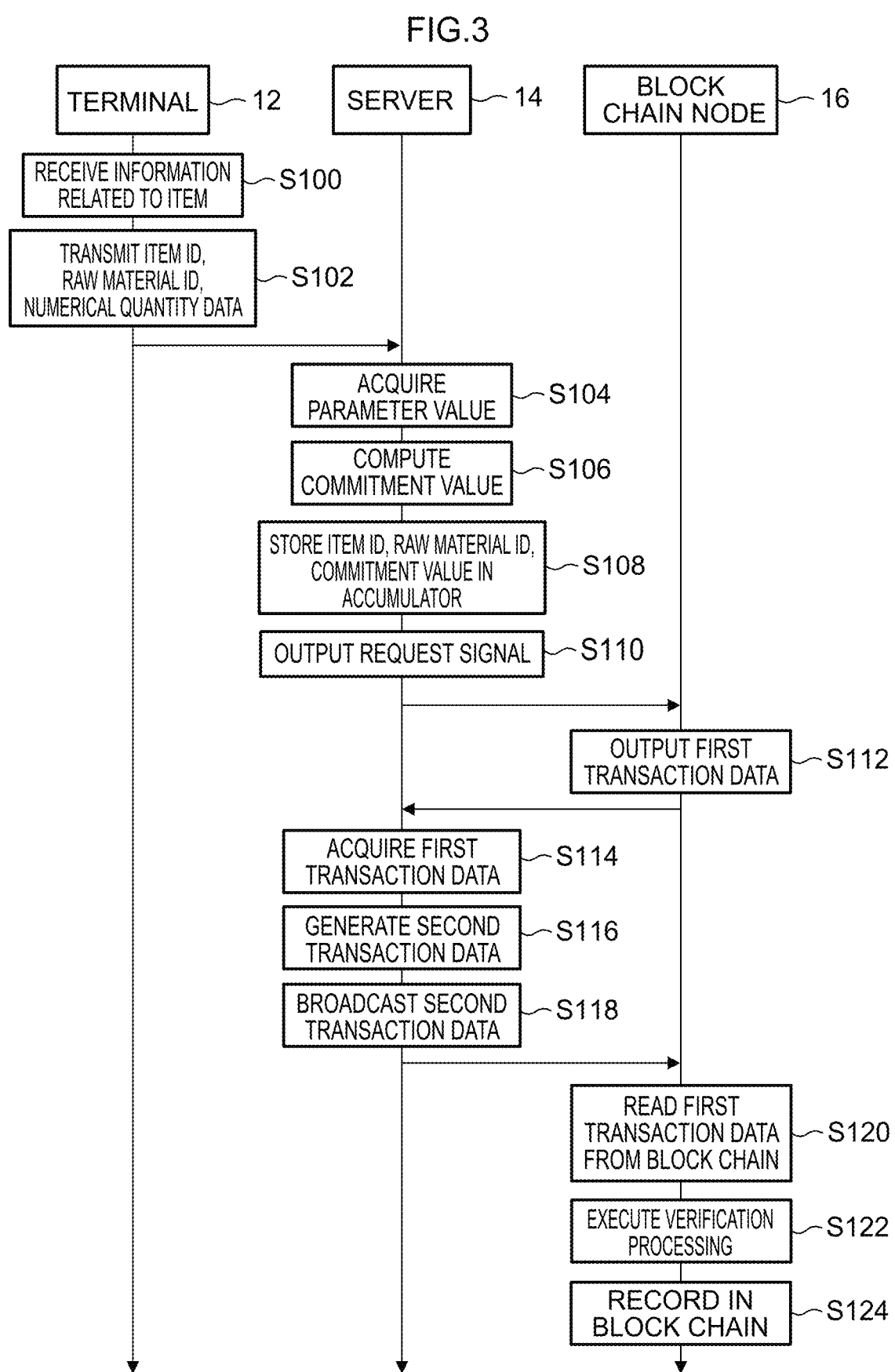
FIG. 3 is an explanatory diagram to explain processing of an information processing system of the present exemplary embodiment.

A sequence illustrated in FIG. 3 is executed when a user operating the terminal 12 inputs the terminal 12 with information related to the product C that is a generation target item.

At step S100, the terminal 12 receives information related to the item input from the user. Note that the information related to the item contains, for example, numerical quantity data expressing the numerical quantities of raw materials configuring the product C that is a generation target item. Note that the following are, for example, numerical quantities (or configuration ratios) of raw materials configuring the product C.

Cobalt: 5
Nickel: 4
Manganese: 9

Moreover, the following are numerical quantities of raw materials configuring the product A that is a generation source item.

Cobalt: 3
Nickel: 7
Manganese: 5

Moreover, the following are numerical quantities of raw materials configuring the product B that is a generation source item.

Cobalt: 4
Manganese: 8

Moreover, the following are numerical quantities of raw materials configuring the product D that corresponds to the raw materials left over unconsumed.

Cobalt: 2
Nickel: 3
Manganese: 4

At step S102, the terminal 12 transmits, to the server 14, item identification data expressing identification information (hereinafter simply referred to as "item ID") of the generation target product C, an item ID of the generation source product A, an item ID of the generation source product B, raw material identification data that is identification information of raw materials (hereinafter simply referred to as "raw material ID") configuring the product C, and numerical quantity data expressing numerical quantities (or ratios) of raw materials consumed when generating the product C.

At step S104, the server 14 receives the data transmitted from the terminal 12 at step S102. Moreover at step S104, the server 14 also acquires parameter values corresponding to the raw materials having the received raw material IDs, a blind parameter value G corresponding to a blind factor, and a random coefficient r for the blind parameter value G. A blind factor rG is data expressing a hypothetical raw material not actually contained in the product C. The random coefficient r for the blind parameter value G is a value of blind numerical quantity data corresponding to numerical quantities of the blind factor.

Note that these parameter values and the blind parameter value G are found by computation using a commitment scheme having additive homomorphic properties. For example, a Pedersen commitment, which is an example of a known method (see, for example, Section 3 of https://link.springer.com/content/pdf/10.1007%2F3-540-46766-1_9.pdf#page=3!), may be employed and the parameter values and the blind parameter value G computed. In cases in which the parameter values and the blind parameter value G are computed using the Pedersen commitment, a point (coordinate) where a discrete logarithm on an elliptical curve is unknown is selected as the parameter values corresponding to each raw material and the blind parameter value G. The parameter values and blind parameter value G having additive homomorphic properties are thereby acquired. For example, the following values are acquired as the parameter values for each raw material.

Cobalt: $H_C$
Nickel: $H_N$
Manganese: $H_M$
Blind parameter value: G

Note that the commitment value $C_A$ of the generation source item product A, and the commitment value $C_B$ of the generation source item product B are computed according to the following equations. $r_1$, $r_2$ are random coefficients for the blind parameter value G. The commitment values $C_A$, $C_B$ are recorded in past transaction data of a block chain, as described later.

$$C_A = r_1 G + 3H_C + 7H_N + 5H_M$$

$$C_B = r_2 G + 4H_C + 0H_N + 8H_M$$

At step S106, the server 14 computes a commitment value $C_C$ of the product C by, as illustrated in the following equation, executing a secret computation to perform a multiply-accumulate operation on the parameter values $H_C$, $H_N$, $H_M$ corresponding to each of the raw materials and the blind parameter value G, and the numerical quantity data of each of the raw materials and a random coefficient $r_3$ for the blind parameter value G.

$$C_C = r_3 G + 5H_C + 4H_N + 9H_M$$

Note that the above commitment value corresponds to one point on the elliptical curve where a discrete logarithm is unknown. This means that how much of a raw material is contained in the product C is not able to be computed from the above commitment value CC.

Moreover, at step S106, the server 14 computes the commitment value $C_D$ of the product D by, as illustrated in the following equation, executing a secret computation to perform a multiply-accumulate operation on the parameter values $H_C$, $H_N$, $H_M$ corresponding to each of the raw materials and the blind parameter value G, and the numerical quantity data of each of the raw materials and a random coefficient $r_4$ for the blind parameter value G.

$$C_D = r_4 G + 2H_C + 3H_N + 4H_N$$

Note that in cases in which a commitment value is computed without introducing a blind factor rG, the commitment value would become the same value when different items were configured by raw materials at the same numerical quantities or at the same raw material ratios. Introducing the blind factor rG enables the commitment value for different items to be made different even in cases in which the different items were configured by raw materials at the same numerical quantities or at the same raw material ratios.

Moreover, due to the following equation (A) being established, the random coefficients $r_1$, $r_2$, $r_3$, $r_4$ are pre-adjusted and set such that the following equation (B) is satisfied.

$$C_A + C_B - (C_C + C_D) = 0\,G \qquad (A)$$

$$r_1 + r_2 - (r_3 + r_4) = 0 \qquad (B)$$

At step S108, the server 14 combines the item ID of the product C with the raw material IDs of each raw material and, for example stores the combination in an accumulator as disclosed in JP-A No. 2021-064219. Storing various data in the accumulator enables item tracking information to be recorded in a block chain while reducing the data volume of the item tracking information. Moreover, the server 14 similarly stores the combination of the item ID of the product D with the raw material IDs of each raw material in a specific data structure.

Note that, as described above, the server 14 sets the parameter values $H_C$, $H_N$, $H_M$ and the blind parameter value G. A commitment value computed based on the parameter values $H_C$, $H_N$, $H_M$ and the blind parameter value G, and on the numerical quantity data corresponding to the combination of raw materials and random coefficient is unique and different to the commitment value computed for another combination of raw materials. This thereby enables the commitment value to be utilized as identification data. The parameter values $H_C$, $H_N$, $H_M$ and the blind parameter value G used when computing the commitment value are stored and managed in the storage section (omitted in the drawings) of the server 14.

Next, the server 14 accesses the block chain nodes 16, and thereby acquires transaction data recorded with an accumulator containing the item ID of the generation source product A in output data, and the transaction data recorded with an accumulator containing the item ID of the generation source product B in output data. Note that the server 14 acquires the transaction data based on the transaction ID appended to the transaction data.

Specifically, at step S110, the server 14 transmits a request signal to the block chain nodes 16 to acquire any transaction data recorded with an accumulator containing the item ID of the generation source product A and the item ID of the generation source product B in output data.

At step S112, on receipt of the request signal transmitted from the server 14 at step S110, the block chain node 16 transmits past transaction data in which the item ID of product A is recorded in output information, and past transaction data in which the item ID of product B is recorded in output data, to the server 14. Such past transaction data is called first transaction data in the present exemplary embodiment.

At step S114, the server 14 acquires the first transaction data output from the block chain node 16.

At step S116, the server 14 generates second transaction data that is transaction data including an address representing an originator of the product C that is the generation target item, an address expressing a recipient of the product C, and the above data structure.

Specifically, the server 14 includes output data of the past first transaction data in input data of the second transaction data. Note that the server 14 generates second transaction data so that a transaction ID on the block chain related to the past first transaction data is also included in the input data of the second transaction data. Moreover, the server 14 includes an item ID, a raw material ID, and a commitment value of the product C in the output data configuring the second transaction data. Note that, as stated above, the item ID and the raw material ID of the product C are stored in the accumulator having a specific data structure. Note that the commitment value may also be stored in the accumulator. Although in the present exemplary embodiment an example has been described of a case in which the item ID and the raw material ID are stored in the accumulator, a configuration may be adopted in which the item ID and the raw material ID are not stored in an accumulator, and are recorded as they are in the output data configuring the second transaction data.

Note that as stated above, data related to the product D corresponding to left over raw materials not consumed are also included in the accumulator when part (or all) of the raw materials is not consumed in the process of generating the product C. This recording method is an implementation example in which a conservation rule between the raw materials represented by the input data and the raw materials represented by the output data is expressed within single transaction data. As another method, a conceivable implementation example is one in which waste that is left over raw material arising when generating the generation target item is recorded in a separated block chain, and reference is made between different block chains.

Figure 4:
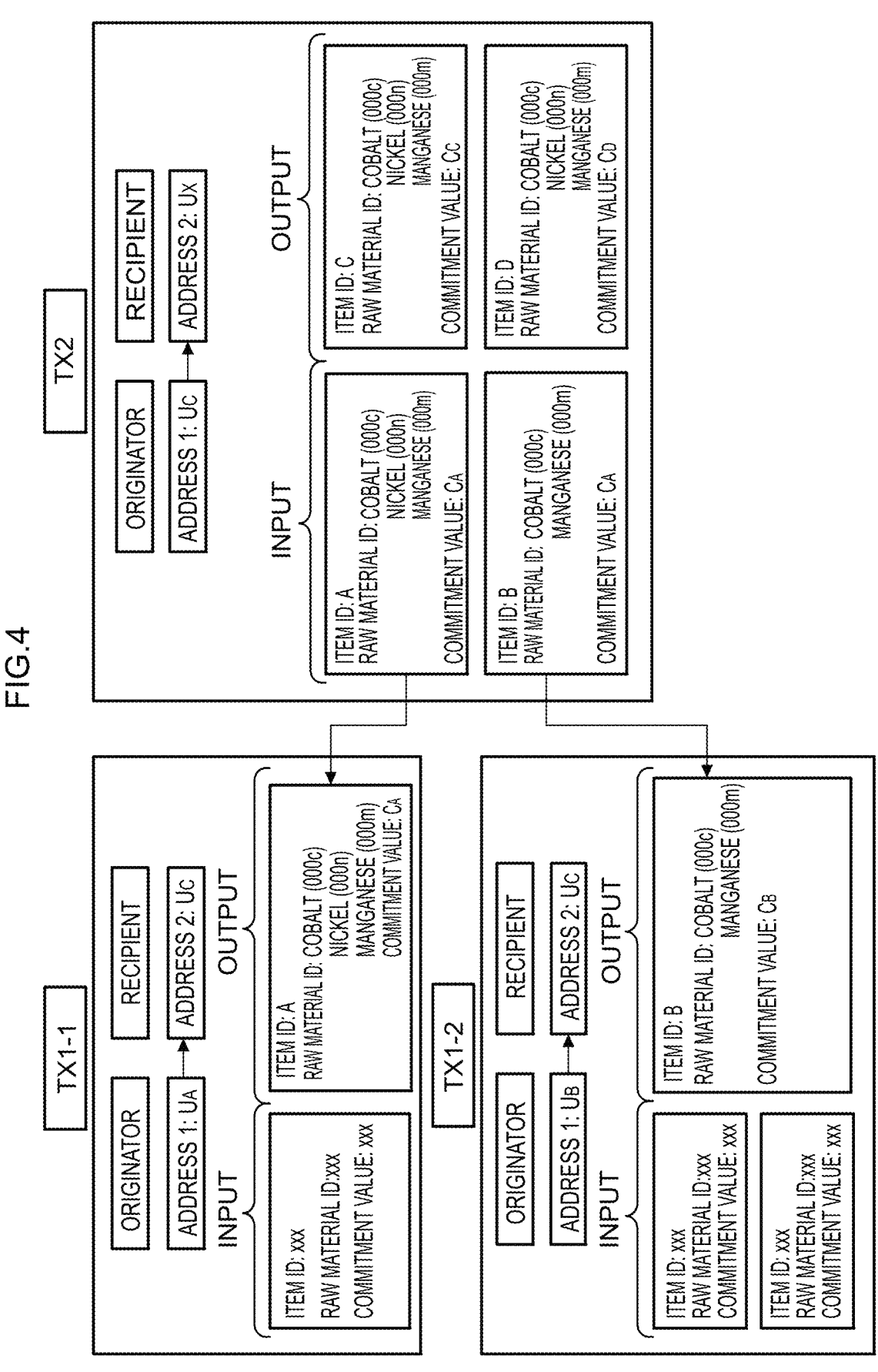
FIG. 4 is a diagram to explain the present exemplary embodiment.

FIG. 4 illustrates a diagram to explain a data structure of transaction data. As illustrated in FIG. 4, an address representing an originator of a product and an address representing a recipient of the product are contained in the transaction data TX2.

Furthermore, as illustrated in FIG. 4, the input data of the transaction data TX2 contains the output data of a past transaction data TX1-1 and the output data of a past transaction data TX1-2.

On the other hand, as illustrated in FIG. 4, an accumulator containing an item ID and the raw material IDs of the generation target product C is contained in the output data of the transaction data TX2. Furthermore, an item ID and raw material IDs of the product D generated from the left over raw materials is contained in this accumulator. Moreover, output data of the transaction data TX1-1 and the transaction data TX1-2, which are generation source item transaction data, include an accumulator stored with the item ID and raw material IDs of the respective products A and B that were past generation targets.

At step S118, the server 14 broadcasts the second transaction data generated at step S118 to the plural block chain nodes 16.

At step S120, each of the plural block chain nodes 16 receives the second transaction data. At step S120, each of the plural block chain nodes 16 reads from the respective block chain each of the first transaction data that is the past transaction data linked to the second transaction data. Specifically, based on the identification data in the block chains related to the past first transaction data contained in the second transaction data, each of the plural block chain nodes 16 reads each of the first transaction data from the block chain in accordance with a specific protocol.

At step S122, based the commitment value $C_C$ of the product C and the commitment value $C_D$ of the left over product D contained in the second transaction data TX2, and on a relationship between the commitment value $C_A$ of the product A contained in the first transaction data TX1-1 and the commitment value $C_B$ of the product B contained in the first transaction data TX1-2, each of the plural block chain nodes 16 verifies whether or not the product C that is the generation target item of the second transaction data TX2 is configured by the raw materials of the products A and B that are the generation source items of the first transaction data TX1-1, TX1-2.

As described above, in cases in which each of the parameter values and the blind factor are generated by a Pedersen commitment, the commitment value of the past transaction data contained in the input data in the second transaction data should be equal to the commitment value contained in the output data thereof. This means, for example, that the generation target item has not been generated appropriately for one or other reason in cases in which a total sum of commitment values contained in the input data in the second transaction data is not equal to the total sum of the commitment values contained in the output data in the second transaction data.

Each of the plural block chain nodes 16 accordingly records the second transaction data to the block chain in cases in which the total sum of the commitment values contained in the output data in the first transaction data (the total sum of the commitment values contained in the input data in the second transaction data) and the total sum of the commitment values contained in the output data in the second transaction data are equal.

However, each of the plural block chain nodes 16 does not record the second transaction data to block chain in cases in which the total sum of the commitment values contained in the output data in the first transaction data (the total sum of the commitment values contained in the input data in the second transaction data) and the total sum of the commitment values contained in the output data in the second transaction data are not equal, and discards the second transaction data.

Note that, for example, a total value of plural commitment values contained in the output data of the transaction data is publicly disclosed on the block chain in cases in which there are plural item IDs contained in the output data.

Specifically when, as computed in the following manner, the sum of the commitment value $C_C$ of the product C contained in the second transaction data TX2 added to the commitment value $C_D$ corresponding to left over raw material arising when the product C is generated is equal to the total sum of commitment values (sum of commitment values $C_A$ and $C_B$) of the raw materials contained in the plural first transaction data TX1-1, TX-2, each of the plural block chain nodes 16 determines that the product C of the second transaction data TX2 is configured by the raw materials of the plural first transaction data TX1-1, TX-2.

$$C_A + C_B - (C_C + C_D) = 0$$

At step S124, each of the plural block chain nodes 16 records the second transaction data TX2 in the block chain when determined that the product C of the second transaction data TX2 is configured by the raw materials of the first transaction data TX1-1, TX-2.

Note that depending on the commitment values written to the transaction data, there is a possibility that overflow occurs when addition processing of the commitment values is executed by each of the block chain nodes 16, and that an erroneous computation result is obtained. A proof that the commitment values lie within an appropriate range is accordingly preferably included. In this implementation a range proof, for example, may be included. Examples of known methods that may be utilized are proof schemes such as Borromean Ring Signatures (https://www.seman-ticscholar.org/paper/Borromean-Ring-Signatures-%E2%88%97-Maxwell-Poelstra/4160470c7f6cf05ffc81a98e8fd67fb0c84836ea), Bulletproofs (https://eprint.iacr.org/2017/1066.pdf), and the like.

Note that authentication processing is executed with the terminal 12 that is the originator of a request signal transmission when the server 14 received from the terminal 12 the request signal expressing a request to disclose parameter values corresponding to the raw material IDs. The server 14 discloses the parameter values to the terminal 12 that is the request signal transmission originator in cases in which the request signal transmission originator terminal 12 is a terminal pre-authorized for parameter value disclosure. This terminal 12 verifies whether or not the product C has been manufactured appropriately based on the disclosed parameter values and the commitment values recorded in the transaction data.

For example, a user who has acquired the generation target product C executes decommit using the commitment values recorded in the block chain to check whether or not the product C has been manufactured based on appropriate raw materials.

Note that decommit may be executed according to the following sequence when a Pedersen commitment is employed to compute the commitment values.

Specifically, for example, the terminal 12X, which is operated by a user who acquired the product C or by a user who is a third party, transmits a specific request signal to the server 14 according to operation of the user. In response to the request signal, after performing the above authentication processing, the server 14 transmits the parameter values $H_C$, $H_N$, $H_M$, the raw material numerical quantity data (cobalt: 5, nickel: 4, manganese: 9), and the blind factor rG to the terminal 12X operated by the user. The terminal 12X also accesses one of the block chain nodes 16, and acquires the commitment value $C_C$ of the product C recorded in the second transaction data.

The terminal 12X employs a known decommit method and, based on the parameter values $H_C$, $H_N$, $H_M$, the raw material numerical quantity data (cobalt: 5, nickel: 4, manganese: 9), the blind factor rG, and the commitment value $C_C$ of the second transaction data recorded in the block chain, generates a verification result representing whether or not the product C was appropriately manufactured from the products A and B. In cases in which the commitment value $C_C$ of the product C recorded in the second transaction data has been computed based on raw material numerical quantity data and also the product C is a product that has been appropriately manufactured from the products A and B (hereinafter simply referred to as "product C has been appropriately generated"), the terminal 12X displays a verification result stating this on a display section (omitted in the drawings). However, in cases in which the product C is not a product that has been appropriately generated, the terminal 12X displays a verification result stating this on a display section (omitted in the drawings).

Note that there is a high possibility that the user who acquired the product C acquires a component table or the like for the product C from the user who generated the product C. This means that the terminal 12X operated by the user who acquired the product C might be able to itself compute a commitment value $C_C'$ of the product C based on the raw material numerical quantity data (cobalt: 5, nickel: 4, manganese: 9), the parameter values $H_C$, $H_N$, $H_M$, and the blind factor rG that are recorded in a component table or the like. This means that the terminal 12X operated by the user who acquired the product C may compare the commitment value $C_C'$ computed itself against the commitment value $C_C$ recorded in the block chain, so as to generate a verification result expressing whether or not the product C is a product that has been generated appropriately.

Note that with regards to the blind factor rG, this may be generated by the terminal 12X operated by the user who acquired the product C, such that each of the generated values is transmitted to the server 14. In such cases, at step S104, the terminal 12X operated by the user who acquired the product C transmits the blind factor rG to the server 14.

Moreover, without disclosing the blind factor rG to the terminal 12X, a known decommit method may be employed to generate a verification result expressing whether or not the product C has been appropriately generated based on a subtraction values resulting from subtracting the blind factor rG from each of the commitment values, and a digital signature generated from the blind factor rG.

Note that KZG commitment may be employed in computation of the commitment value (see, for example, https://www.iacr.org/archive/asiacrypt2010/6477178/6477178.pdf). When a Pedersen commitment has been utilized, there is a need to publicly disclose the raw material numerical quantity data contained in the commitment value when performing decommit. In contrast thereto, when a KZG commitment that is a commitment scheme utilizing a polynomial is used then this enables numerical quantity data for merely some of the raw materials to be publicly disclosed.

Specifically, when KZG commitment is used to compute the commitment values, publicly disclosed numerical quantity data can be limited to some raw material configuring the item, and the numerical quantity data for the other raw materials can be concealed. The commitment values are computed using a polynomial when a KZG commitment is used to compute the commitment values. Note that commitment values computed using different polynomials can be added due to the property of having additive homomorphic properties when a KZG commitment is used to compute the commitment values.

In cases in which a KZG commitment is used to compute the commitment values, a polynomial f(x) is configured in which x is the parameter values expressing target raw materials and the blind parameter value, and the values computed by the polynomial f(x) are the quantities of the target raw materials and the blind factor value, a KZG commitment is generated for this polynomial, and a commitment value that conceals the raw materials and quantities thereof is created.

Note that the above blind parameter value need not necessarily be included when configuring the polynomial.

Note that although in the examples described above examples are described of cases in which a Pedersen commitment and a KZG commitment computation are used in commitment value computation, any commitment scheme may be utilized as long as it is a commitment scheme having additive homomorphic properties.

As described above, the terminals of the information processing system according to the present exemplary embodiment transmit, to the server, generation target item identification data expressing identification information of generation target items, raw material identification data that is identification information of raw materials used when generating the generation target item, numerical quantity data expressing numerical quantities of the raw materials, and generation source item identification data expressing identification information of generation source items. The server computes a commitment value of the generation target item by performing a secret computation based on parameter values and the numerical quantity data corresponding to the raw materials. The server stores a combination of the commitment value, the raw material identification data, and the generation target item identification data in a specific data structure. The server acquires first transaction data that is transaction data recorded in a block chain stored in a storage section of a block chain node and that is transaction data containing the generation source item identification data in output data. The server then broadcasts, to plural block chain nodes, second transaction data that is transaction data containing an address expressing an originator of a generation target item, an address expressing a recipient of the generation target item, and a data structure, and that contains a data structure including the generation source item identification data in input data and the generation target item identification data in output data. Each of the plural block chain nodes reads from the block chain respective first transaction data that is past transaction data linked to the second transaction data broadcast by the server. Each of the plural block chain nodes verifies whether or not the item of the second transaction data has been configured by raw materials contained in the generation source items of the first transaction data based on a relationship between the commitment value of the generation target item contained in the second transaction data and the commitment values of the generation source items contained in the first transaction data. Each of the plural block chain nodes then records the second transaction data in the block chain in cases in which determination is that the generation target item of the second transaction data has been configured by the raw materials of the first transaction data. This thereby enables verification that transactions of the raw materials contained in an item are not improper, while still keeping the numerical quantities of the raw materials contained in the item secret.

Moreover, introducing the blind factor rG when computing the commitment value of the item enables the commitment values of different items to be prevented from being the same value.

Note that the present disclosure is not limited to the exemplary embodiments described above, and various modifications and applications are possible within a range not departing from the spirit of the present invention.

For example, the items are not limited to being real objects, and specific data is also encompassed therein.

Moreover, although in the above exemplary embodiment description has been given of an example of a case in which the blind factor rG is introduced when computing the commitment value, there is no limitation thereto. The commitment value may be computed without introducing a blind factor rG.

Moreover, although in the exemplary embodiment described above an example has been described in which the random coefficients $r_1$, $r_2$, $r_3$, $r_4$ have been pre-adjusted so as to satisfy above equation (B), there is no limitation thereto. In cases in which the random coefficients $r_1$, $r_2$, $r_3$, $r_4$ do not satisfy above equation (B), a known method may be employed to verify whether or not the generation target product has been manufactured appropriately from the generation source products by appending a digital signature to a value corresponding to the term on the right of the following equation.

$$C_A + C_B - (C_C + C_D) = (r_1 + r_2 - (r_3 + r_4))G$$

In such cases, as described above, the server 14 computes the commitment value $C_C$ of the generation target product C using a blind factor rG when computing the commitment value of the generation target product C. Then, the server 14 generates a digital signature of the server 14 for the information representing a difference between the sum $(C_C+C_D)$ of the commitment value $C_C$ of the generation target product C and the commitment value $C_D$ corresponding to the left over raw materials contained in the second transaction data, and the total sum $(C_A+C_B)$ of the commitment values of the generation source products A and B contained in the plural first transaction data, and adds this digital signature to the second transaction data. This means that even in cases in which an arithmetic operation result of $(C_A+C_B)-(C_C+C_D)$ does not equal 0, because a digital signature has been appended to this arithmetic operation result, based on this digital signature verification can still be made as to whether or not the generation target product has been appropriately manufactured from generation source products.

Moreover, although in the above exemplary embodiment an example has been described of a case in which the product D is generated corresponding to left over raw materials not consumed when generating the product C, there is no limitation thereto, and the present exemplary embodiment is applicable even in cases in which left over raw material does not arise.

Moreover, although in the above exemplary embodiment an example has been described of a case in which the server 14 executes various processing, part or all of these various processing may be executed by a terminal 12 or by a block chain node 16.

In the present specification exemplary embodiments have been described in which a program is pre-installed, however, this program may be provided stored on a computer-readable recording medium. For example, the program may be provided in a format stored on a non-transitory storage medium such as compact disc read only memory (CD-ROM), digital versatile disc read only memory (DVD-ROM), universal serial bus (USB) memory, or the like. Alternatively, the program may be provided in a format downloadable from an external device over a network.

Note that the processing executed by the CPU reading and executing software (a program) in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). Alternatively, a general-purpose graphics processing unit (GPGPU) may be employed as a processor. The respective processing may be executed by any one of these various types of processor, or may be executed by a combination of two or more of the same type or different types of processor (such as plural FPGAs, or a combination of a CPU and an FPGA). The hardware structure of these various types of processors is more specifically an electric circuit combining circuit elements such as semiconductor elements.

Moreover, the respective processing of the exemplary embodiments may be executed by configuring by a computer, a server, or the like, including a general computation processing device, a storage device, and the like, and executing the respective processing using a program. Such a program may be stored in a storage device, recorded on a recording medium such as a magnetic disc, an optical disc, or semiconductor memory, or provided over a network. Obviously, the various other configuration elements do not necessarily have to be realized by a single computer or server, and may be shared between and realized by plural separate computers connected together over a network.

All cited documents, patent applications, and technical standards mentioned in the present specification are incorporated by reference in the present specification to the same extent as if each individual cited document, patent application, or technical standard was specifically and individually indicated to be incorporated by reference.

Note that in the above exemplary embodiments, cases in which "only" is not employed, such as "based on only . . . ", "in response to only . . . ", and "in cases in which only . . . ", envisage that additional information may also be taken into consideration in the present specification. As an example, "in cases in which A occurs, B is performed" does not necessarily mean that B is always performed when A occurs, unless clearly stated otherwise.

In any method, program, terminal, device, server, or system (hereafter "method, etc."), even in there is an aspect of performing an operation different to operation described in the present specification, the respective aspects of technology disclosed herein are applicable to any operations the same as any operations described in the present specification, the presence of the operation different to the operation described in the present specification does not mean that the method, etc. is outside the range of the respective aspects of the technology disclosed herein.

The entire content of the disclosures of Japanese Patent Application No. 2022-061015 filed on Mar. 31, 2022, and Japanese Patent Application No. 2023-018759 filed on Feb. 9, 2023, are incorporated by reference in the present specification. All publications, patent applications and technical standards mentioned in the present specification are incorporated by reference in the present specification to the same extent as if each individual publication, patent application, or technical standard was specifically and individually indicated to be incorporated by reference.

value of the generation source item contained in the first transaction data.

The invention claimed is:

1. An information processing system comprising a server, a plurality of block chain nodes, and a plurality of terminals, wherein in the information processing system:

a first terminal of the plurality of terminals:

transmits, to the server, generation target item identification data expressing identification information of a generation target item, raw material identification data that is identification information of a raw material used when generating the generation target item, numerical quantity data expressing a numerical quantity of the raw material, and generation source item identification data expressing identification information of a generation source item;

the server:

computes a commitment value of the generation target item by performing a secret computation based on a parameter value and the numerical quantity data corresponding to the raw material;

wherein: when computing the commitment value of the generation target item, the server improves concealment by adding a blind parameter value corresponding to a blind factor expressing a raw material not actually contained in the generation target item, and a pre-adjusted blind numerical quantity data expressing a numerical quantity of the blind factor, to input of the secret computation, and computing the commitment value of the generation target item;

stores a combination of the raw material identification data and the generation target item identification data in a specific data structure;

acquires first transaction data that is transaction data recorded in a block chain stored in a storage section of a first block chain node of the plurality of block chain nodes and that is transaction data containing the generation source item identification data in output data; and broadcasts, to the plurality of block chain nodes, second transaction data that is transaction data containing an address expressing an originator of the generation target item, an address expressing a recipient of the generation target item, and the data structure, and that includes the generation source item identification data in input data and that includes the data structure including the generation target item identification data in output data; and each of the plurality of block chain nodes:

reads from the block chain each first transaction data that is past transaction data linked to the second transaction data broadcast by the server;

verifies whether or not the generation target item of the second transaction data is configured by the raw material contained in the generation source item of the first transaction data based on a relationship between the commitment value of the generation target item contained in the second transaction data and a commitment value of the generation source item contained in the first transaction data; and records the second transaction data in the block chain in cases in which the generation target item of the second transaction data has been determined to be configured from the raw material of the first transaction data.

2. The information processing system of claim 1, wherein:

when the plurality of block chain nodes verifies whether or not the generation target item of the second transaction data is configured by raw materials of a plurality of the first transaction data, the generation target item of the second transaction data is determined to be configured by the raw materials of the plurality of first transaction data in cases in which a sum of the commitment value of the generation target item contained in the second transaction data added to a commitment value corresponding to remaining raw materials arising as left over when generating the generation target item is equal to a total sum of commitment values of generation source items contained in the plurality of first transaction data.

3. The information processing system of claim 1, wherein on receipt of a request signal expressing a request to disclose the parameter value, the server executes authentication processing with an originator terminal of the request signal and discloses the parameter value to the originator terminal of the request signal in cases in which the originator terminal of the request signal is a terminal pre-authorized for disclosure of the parameter value.

4. The information processing system of claim 1, wherein:

the server, when computing the commitment value of the generation target item, computes the commitment value of the generation target item by adding a result of a multiply-accumulate operation performed on the blind parameter value corresponding to the blind factor expressing the raw material not actually contained in the generation target item and the pre-adjusted blind numerical quantity data expressing the numerical quantity of the blind factor, to a result of a multiply-accumulate operation performed on the parameter value and the numerical quantity data.

5. The information processing system of claim 1, wherein:

when computing the commitment value of the generation target item, the server computes the commitment value of the generation target item by adding a result of a multiply-accumulate operation performed on the blind parameter value corresponding to the blind factor expressing the raw material not actually contained in the generation target item and random blind numerical quantity data expressing the numerical quantity of the blind factor, to a result of a multiply-accumulate operation performed on the parameter value and the numerical quantity data, and generates a digital signature of the server for information expressing a difference between a sum of the commitment value of the generation target item contained in the second transaction data added to a commitment value corresponding to left over of the raw material arising when generating the generation target item, and a total sum of commitment values of generation source items contained in a plurality of the first transaction data, and adds the digital signature to the second transaction data.

6. The information processing system of claim 1, wherein a KZG commitment that is a commitment scheme using a polynomial is utilized when computing the commitment value, and numerical quantity data is publicly disclosable only for some raw material.

7. An information processing method that is executed in an information processing system including a server, a plurality of the block chain nodes, and a plurality of terminals, wherein in the information processing method:

a first terminal of the plurality of terminals:

transmits, to the server, generation target item identification data expressing identification information of a generation target item, raw material identification data that is identification information of a raw material used when generating the generation target item, numerical quantity data expressing a numerical quantity of the raw material, and generation source item identification data expressing identification information of a generation source item;

the server:

computes a commitment value of the generation target item by performing a secret computation based on a parameter value and the numerical quantity data corresponding to the raw material;

wherein: when computing the commitment value of the generation target item, the server improves concealment by adding a blind parameter value corresponding to a blind factor expressing a raw material not actually contained in the generation target item, and a pre-adjusted blind numerical quantity data expressing a numerical quantity of the blind factor, to input of the secret computation, and computing the commitment value of the generation target item;

stores a combination of the raw material identification data and the generation target item identification data in a specific data structure;

acquires first transaction data that is transaction data recorded in a block chain stored in a storage section of a first block chain node of the plurality of block chain nodes and that is transaction data containing the generation source item identification data in output data; and broadcasts, to the plurality of block chain nodes, second transaction data that is transaction data containing an address expressing an originator of the generation target item, an address expressing a recipient of the generation target item, and the data structure, and that includes the generation source item identification data in input data and that includes the data structure including the generation target item identification data in output data; and each of the plurality of block chain nodes:

reads from the block chain each first transaction data that is past transaction data linked to the second transaction data broadcast by the server;

verifies whether or not the generation target item of the second transaction data is configured by the raw material contained in the generation source item of the first transaction data based on a relationship between the commitment value of the generation target item contained in the second transaction data and a commitment value of the generation source item contained in the first transaction data; and records the second transaction data in the block chain in cases in which the generation target item of the second transaction data has been determined to be configured from the raw material of the first transaction data.

\* \* \* \* \*